United States Patent [19]

Naohiko et al.

[11] 4,095,338
[45] Jun. 20, 1978

[54] LAWN TRIMMER EQUIPPED WITH FLEXIBLE LINE CUTTING EDGES

[75] Inventors: Hobara Naohiko; Hori Katsumi; Sugimoto Sadanobu, all of Okayama, Japan

[73] Assignee: Kaaz Machinery Co., Ltd., Okayama, Japan

[21] Appl. No.: 810,185

[22] Filed: Jun. 27, 1977

[30] Foreign Application Priority Data

Jun. 26, 1976 Japan .................. 51-84347[U]

[51] Int. Cl.² .................. A01D 55/18; B26B 27/00
[52] U.S. Cl. .................. 30/276; 56/12.7
[58] Field of Search .................. 30/276, 347; 56/12.7, 56/295; 51/335, 336, 337, 367

[56] References Cited

U.S. PATENT DOCUMENTS

| | | | |
|---|---|---|---|
| 2,697,457 | 12/1954 | Lawrence | 30/276 X |
| 3,540,169 | 11/1970 | Mahoney | 51/335 |
| 3,708,967 | 1/1973 | Geist et al. | 56/12.7 |
| 4,006,528 | 2/1977 | Katsuya | 30/276 |
| 4,007,525 | 2/1977 | Utter | 30/276 |
| 4,020,552 | 5/1977 | Mizuno et al. | 30/276 |
| 4,043,103 | 8/1977 | Lakin et al. | 56/295 |
| 4,047,299 | 9/1977 | Bair | 30/347 |

*Primary Examiner*—Jimmy C. Peters
*Attorney, Agent, or Firm*—Koda and Androlia

[57] ABSTRACT

A lawn trimmer equipped with flexible line cutting edges including a dish-shaped bobbin housing having an open end, a rotary shaft provided in the housing for being driven by a prime mover, a bobbin provided on the shaft and having a top flange which closes the open end of the housing, a flexible line wound on the bobbin, at least one finger grip provided in the top flange such that the bobbin may be rotated manually, at least one flexible line extension hole provided in a bottom of the housing, and a guide plate coupled to the housing.

8 Claims, 4 Drawing Figures

LAWN TRIMMER EQUIPPED WITH FLEXIBLE LINE CUTTING EDGES

BACKGROUND OF THE INVENTION

1. Field of the Invention

This invention relates to lawn trimmers equipped with a flexible line cutting edge and more particularly, to bobbin housings for such lawn trimmers.

2. Description of the Prior Art

Lawn trimmers are devices which cut grass, weeds, etc. by using an engine or motor to drive rotary cutting edges. The rotary cutting edges are usually metal blades which can create hazards depending on the conditions of use and which are also undesirable in that damage is done either to trees or to the rotary cutting edges whenever the machine is used to trim under growth, grass, etc. around trees or in the vicinity of walls or other structures.

Accordingly, lawn trimmers which utilize the whirling motion of soft pliable flexible nylon cord have been developed and have to some extent been put to practical use. However, various drawbacks have been encountered in the handling and operation of such devices. In particular, due to structural defects in the bobbin used for the storage and extension of the nylon cord which is employed as the flexible line, and to defects in the bobbin housing, it is difficult to rewind an overextended cord. Furthermore, the extension of the cord often becomes impossible due to the twisting of two lengths of nylon cord inside the single bobbin. In addition, the cord is easily cut due to the fact that it is extended from the circumference of the housing. Also, the machine is easily fouled by the penetration of refuge material into the interior of the housing.

The simplest conventional lawn trimmer is equipped with flexible line cutting edges (such as disclosed in U.S. Pat. No. 3,826,068 and 3,859,776) are designed as shown in FIG. 1. FIG. 1 is a cross sectional representation of such a prior art device. In FIG. 1, the bobbin housing 1 is rigidly mounted on a rotary shaft 2 and is shaped in the form of a cover with an open bottom. The bobbin 3 is inserted in the housing from below and is clamped in place from beneath by a clamping plate 4. Projection 6 on the bobbin fit into holes 5 in the top of housing 1 so that the bobbin and housing rotate as a single unit. In this design, the flexible line 7 can be extended by loosening the clamping plate 4 so that the projections 6 are removed from the holes 5. However, the line cannot be rewound on the bobbin in this condition. To do this, it is necessary to remove the bobbin from the housing. Since the line cannot easily be rewound, it is not possible to easily shorten the length of the extended flexible line. Accordingly, it is difficult to adjust the length of the line to suit the type and condition of the growth of weeds, etc. that ought to be trimmed. Furthermore, since the flexible line 7 projects directly outward from the side wall of the housing 1, accidental contact between the perimeter of the housing 1 and a concrete wall, etc. leads to the immediate cutting of the flexible line, an undesirable result.

SUMMARY OF THE INVENTION

Accordingly, it is a general object of the present invention to provide a bobbin and housing for a lawn trimmer equipped with a flexible line cutting edge in which the flexible line can be easily rewound or extended.

It is another object of the present invention to provide a bobbin housing and bobbin for a lawn trimmer equipped with flexible line cutting edges in which the flexible line is not cut when the housing contacts an object.

It is yet another object of the present invention to provide a housing and bobbin for lawn trimmers equipped with flexible line cutting edges which prevent refuge material from fouling the lawn trimmer.

In keeping with the principles of the present invention, the objects are accomplished by a unique lawn trimmer equipped with flexible line cutting edges. The lawn trimmer includes a dish shaped bobbin housing having an open end, a rotary shaft provided in the housing for being driven by a prime mover, a bobbin provided on the shaft and having a top flange which closes the open end of the housing, a flexible line wound on the bobbin, at least one finger grip provided in the top flange such that the bobbin may be rotated manually, at least one flexible line extension hole provided in a bottom of the housing, and a guide plate rotatably coupled to the housing.

BRIEF DESCRIPTION OF THE DRAWINGS

The above mentioned features and objects of the present invention will become more apparent by reference to the following figures, in which like referenced numerals denote like elements and in which.

DESCRIPTION OF THE INVENTION

Figure 2:
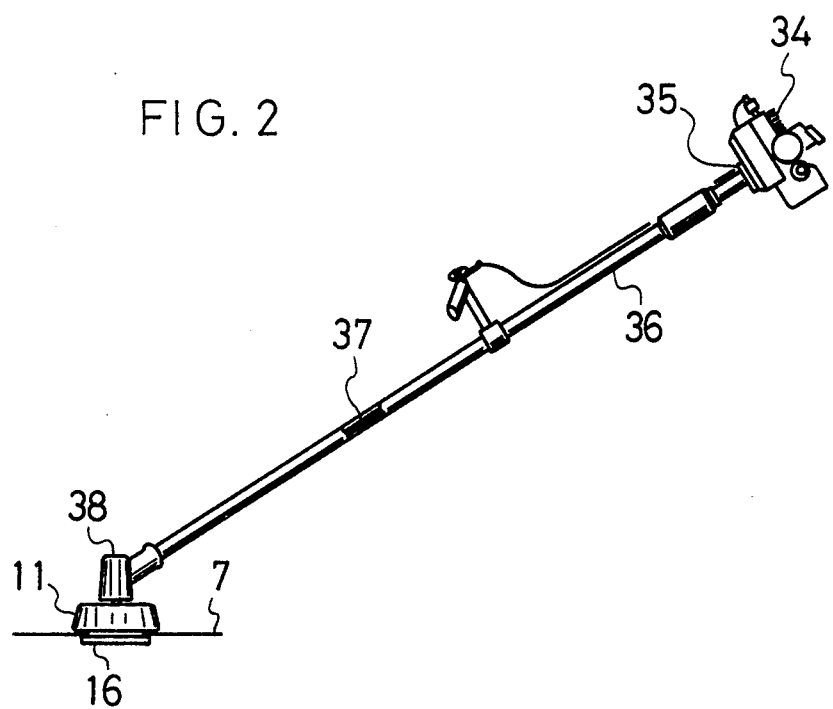
FIG. 2 is a plan view of a housing for a lawn trimmer in accordance with the teachings of the present invention.
Figure 3:
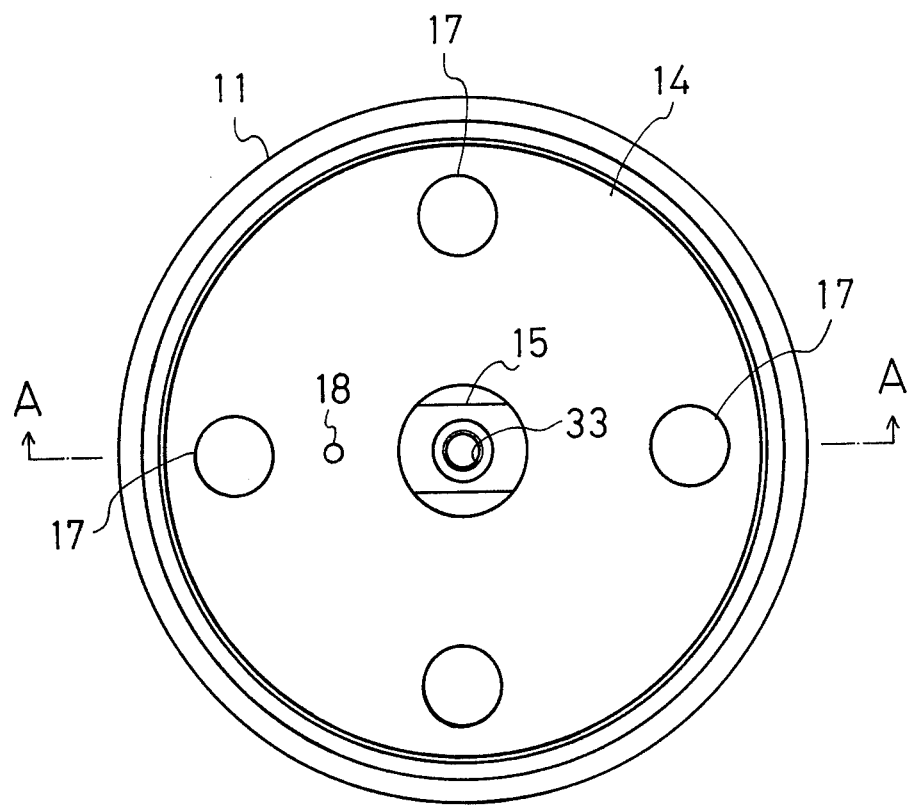
FIG. 3 is a cross section along the lines A—A in FIG. 2.

Referring to FIG. 2, shown therein is a bobbin and housing in accordance with the teachings of the present invention and FIG. 3 is a cross sectional view along the lines A—A in FIG. 2. From these two figures, a complete description of the present invention will be made.

As is shown in the figures, the bobbin housing 11 is dish-shaped so that it is open at the top. A top flange 14 of a bobbin 13 serves as the top plate of the housing 11. The bobbin 13, together with housing 11, are tightened down against guide plate 16 by a screw threaded counter to the direction of rotation of the housing 11 and bobbin 13 so that they are rigidly fastened to the rotary shaft 15.

As described above, flange 14 is the upper surface of bobbin 13 and doubles as a cover for the bobbin housing 11. Finger grip 17, which can be turned by hand, are installed in from one to eight places near the outer periphery of the upper surface of flange 14 and a hole 18 for securing the ends of flexible line 7 is drilled in the vicinity of the inner rim of flange 14. Bottom flange 19 of the bobbin 13 is of sufficiently smaller diameter to permit the rewinding of the line. Indentions 20 which are oriented toward the spring loaded balls 27 (which are described below) are provided in several places on the under surface of the bottom flange 19 of the bobbin 13. The indentations 20 are located in the same orbit of revolution (with respect to the shaft 15) as the spring loaded balls 20. This arrangement is very convenient in that it facilitates rotation of the bobbin 13 with respect to the housing 11 and in that the sound made by the spring loaded balls 27 popping into the indentations 20 provides a standard for measuring rotation of the bobbin during the adjustment of the length of the extended line. A key way 21 and a shaft hole 24 are provided in the center of the bobbin 13. Shaft 15 fits into shaft hole 24 and key 23 provided on shaft 15 fits into key way 21. Finger grip 17 and the top flange 14 of the bobbin do not have to be the round impressions as shown in FIGS. 2 and 3, but could also be projecting studs, etc.

The bobbin housing 11 is disc-shaped and holes 26 for the extension of flexible line 7 are provided in the bottom 25 of the housing 11 at two locations which are on a diagonal line near the perimeter of the housing 11. Spring loaded balls 27 are provided at equal intervals in from two to four places on the same circle in the bottom 25 of the housing 11. The indentations 20 in the bobbin 13 are located on the same circle as the spring loaded balls 27. The extension holes 26 are further beveled to insure a smooth extension of the flexible line 7. When necessary, metal bushings 22 which prevent melting and adhesion of the nylon cord to the housing 11 as a result of friction at high RPM may be inserted into the extension holes 26. Furthermore, direction of the holes 26 does not have to be vertical as shown in the figures. They could also be opened obliquely outward and downward or arc-shaped slots provided in a circular orientation. Key way 21, into which key 23 of the rotary shaft 15 is inserted, is provided in the center of the housing 11. This key 23 and key way 21 cause the housing 11 to rotate as a single unit with the rotary shaft 15 during the operation of the lawn trimmer.

The bobbin 13 and the housing 11 are clamped together by means of a counter screw 28 provided in the tip of the rotary shaft 15. The guide plate 16 which is equipped with a threaded hole 29, is tightened down with the counter screw 28. If a counter screw is not used, it is necessary to install an appropriate means for independently checking the rotation of the guide plate 16 and the other parts. In operation, grass is cut by whirling the flexible line 7 with the guide plate 16 placed near to the ground.

Figure 1:
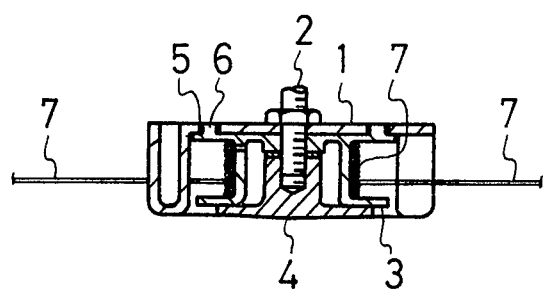
FIG. 1 is a cross sectional view of a prior art housing for a lawn trimmer equipped with flexible line cutting edges.

Flexible line 7 is rewound onto the bobbin by means of the following procedure. Firstly, lengths of the flexible line 7 are taken from beneath the line extension holes 26 and passed in opposite directions. Then, the ends of both lines are inserted into the line securing hole 18 in the top flange 14 of the bobbin 13. Next, key way 21 in the housing and the bobbin 13 are lined up and key 23 on the rotary shaft 15 is inserted and the guide plate 16 is screwed down far enough on the rotary shaft counter screw 28 to prevent easy turning of the housing 11 and bobbin 13. The rim of the housing 11 is held in place with one hand while the other hand is applied to the finger grip 17 and the top flange 14 of the bobbin 13. By then rotating the bobbin 13 in the opposite direction from the direction in which the lawn trimmer rotates, the flexible line 7 is wound onto the bobbin 13. This procedure prevents the extension of the flexible line from becoming difficult due to interwinding of the line during rewinding. Such a procedure is not possible in the prior art model shown in FIG. 1.

FIG. 3 illustrates the bobbin 13 and housing 11 clamped together by means of a guide plate 16. Since the rim of the guide plate 16 covers the bottom of the line extension holes 26, the gap 30 therebetween must be slightly greater than the diameter of the flexible line 7. Furthermore, projecting rim 31 is installed on the undersurface of housing 11 to prevent the line from coiling up. This rim overlaps with the inside of the guide plate rim 32 and the gap between the two is less than one-half the diameter of the flexible line 7. Accordingly, the line is prevented from coiling up inside this part. Since the flexible line 7 is thus extended from the bottom of the housing 11 through the gap 30 instead of the side, there is no danger of the flexible line 7 being cut by being caught between the housing and another surface, even if the side of the housing 11 should temporarily come in contact with a hard surface such as a concrete block wall or a decorative garden stone, etc. Accordingly, the life of the flexible line 7 is substantially lengthened.

Figure 4:
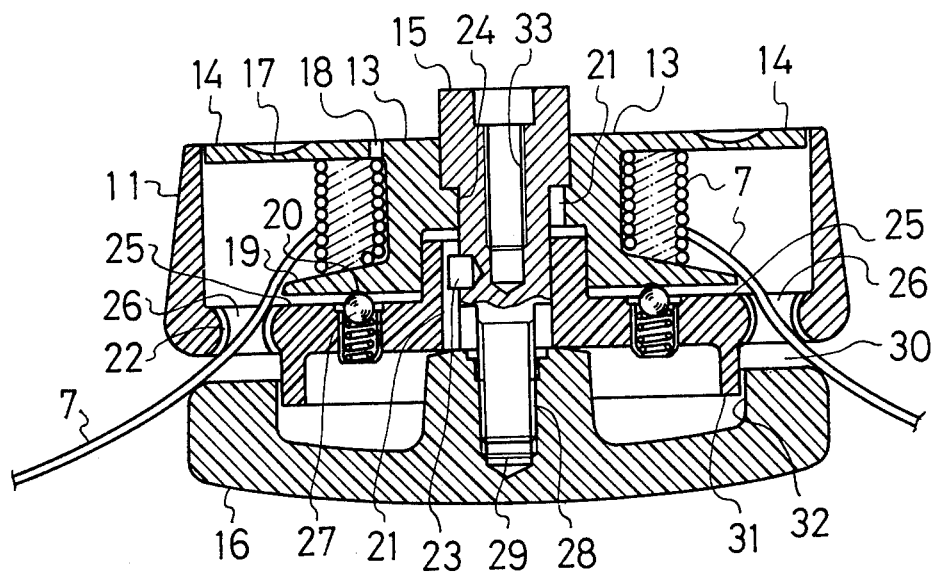
FIG. 4 is a side view illustrating the housing attached to the main body of a portable lawn trimmer.

The housing for lawn trimmers equipped with a flexible line cutting edges provided in accordance with the teachings of the present invention constitutes the head of a lawn trimmer. The counter threaded hole 33 and the upper portion of the rotary shaft 15 can be fastened to the main body of a lawn trimmer machine in such a way that it can be easily attached or removed as desired. As shown in FIG. 4, the housing of the present invention can be effectively used by fastening it to the main body of a portable lawn trimmer normally equipped with metal rotary cutting edges. in FIG. 2, the portable lawn trimmer is provided with an engine 34, a clutch housing 35, main pipe 36, main shaft 37 and a gear box 38.

It should be apparent that the housing of the present invention is driven by the engine 34 via the clutch housing 35, main shaft 37 and gear box 38.

In all cases it is understood that the above described embodiment is merely illustrative of but one of the many possible specific embodiments which respresent the applications of the principles of the present invention. Furthermore, numerous and varied other arrangements can be readily devised by those skilled in the art in accordance with those principles without departing from the spirit and scope of the invention.

What is claimed is:

1. A lawn trimmer provided with flexible line cutting edges comprising:
   a dish-shaped bobbin housing having an open top end;
   a rotary shaft provided in said housing;
   a bobbin rotatably provided on said shaft and having a bottom flange and having a top flange closing said open top end of said housing;
   a flexible line wound on said bobbin;
   at least one finger grip provided in said top flange such that said bobbin may be rotated manually independently of said housing;
   at least one flexible line extension hole provided in a bottom of said housing; and
   a guide plate coupled to said housing.

2. A lawn trimmer according to claim 1 further comprising at least two indentations provided in said bottom flange and at least two spring loaded balls provided in said housing opposite said indentations.

3. A lawn trimmer according to claim 2 wherein said flexible line is nylon.

4. A lawn trimmer according to claim 1 wherein said flexible line is nylon.

5. A lawn trimmer according to claim 1 wherein a gap of slightly greater than the diameter of said flexible line is provided between said housing and said guide plate.

6. A lawn trimmer according to claim 2 wherein a gap of slightly greater than the diameter of said flexible line is provided between said housing and said guide plate.

7. A lawn trimmer according to claim 3 wherein a gap of lightly greater than the diameter of said flexible line is provided between said housing and said guide plate.

8. A lawn trimmer according to claim 7 further comprising:
an engine;
a clutch coupled to the out put of said engine;
a main shaft coupled to an output side of said clutch; and
a gear box coupled between said main shaft and said guide plate.

* * * * *